(12) United States Patent
Moisiadis et al.

(10) Patent No.: US 10,262,094 B2
(45) Date of Patent: Apr. 16, 2019

(54) SYNTHESIS OF DC ACCURATE NOISE COMPATIBLE REDUCED NETLIST

(71) Applicant: Helic, Inc., Santa Clara, CA (US)

(72) Inventors: Yiannis Moisiadis, Athens (GR); Nikolaos Mouravliansky, Athens (GR); Konstantis Daloukas, Athens (GR)

(73) Assignee: Helic, Inc., San Jose, CA (US)

( * ) Notice: Subject to any disclaimer, the term of this patent is extended or adjusted under 35 U.S.C. 154(b) by 239 days.

(21) Appl. No.: 14/754,480

(22) Filed: Jun. 29, 2015

(65) Prior Publication Data
US 2016/0378889 A1 Dec. 29, 2016

(51) Int. Cl.
*G06F 17/50* (2006.01)
(52) U.S. Cl.
CPC .................. *G06F 17/505* (2013.01)
(58) Field of Classification Search
USPC ....................................................... 716/104
See application file for complete search history.

(56) References Cited

U.S. PATENT DOCUMENTS

2014/0280251 A1* 9/2014 Somekh ............ G06F 17/30867
707/754

OTHER PUBLICATIONS

Ionutiu, Roxana; "Model Order Reduction for Multi-terminal Systems with Applications to Circuit Simulation," 2011, Technische Universiteit Eindhoven.*
King, R.; "The Ideal Transformer," 2004, University of Toledo.*
Palenius, Timo; Roos, Janne; "Comparison of Reduced-Order Interconnect Macromodels for Time-Domain Simulation," 2004, IEEE Transactions on Microwave Theory and Techniques, vol. 52, No. 9.*

* cited by examiner

*Primary Examiner* — Eric D Lee
(74) *Attorney, Agent, or Firm* — Shami Messinger PLLC (57) ABSTRACT

In one embodiment, a circuit analysis method includes obtaining a netlist of a circuit, generating a reduced model from the netlist, using the reduced model to synthesize a noise compatible netlist, ensuring accurate DC behavior, and simulating the circuit using the synthesized netlist.

14 Claims, 5 Drawing Sheets

SYNTHESIS OF DC ACCURATE NOISE COMPATIBLE REDUCED NETLIST

STATEMENT OF RELATED APPLICATION(S)

The instant disclosure may be considered related U.S. patent application Ser. No. 14/754,464, entitled "SYNTHESIS OF REDUCED NETLIST HAVING POSITIVE ELEMENTS AND NO CONTROLLED SOURCES", and filed on even date herewith.

TECHNICAL FIELD

The instant disclosure relates generally to software tools for designing and modeling electronic systems, such as printed circuit boards and integrated circuits.

BACKGROUND

A variety of specialized software tools have been developed to meet the challenges of designing and manufacturing more complex and higher performance electronic systems such as printed circuit boards and integrated circuits (ICs). Layout verification software, such as layout-vs-schematic (LVS) and design rule check (DRC), is used to ensure that the layout connectivity of the physical design of a chip matches the logical design of the chip represented by a schematic and to verify that a design of an IC chip conforms to certain manufacturing tolerances that are required in fabricating the chip. Parasitic extraction generates an equivalent model of the integrated circuit, modeling and extracting the parasitic resistance, inductance and capacitance of the chip. These tools exist in one or more areas commonly referred to as electronic design automation (EDA), electronic computer aided design (ECAD), and technology computer aided design (TCAD). A single EDA platform can offer software modules for integrated circuit layout design, behavioral simulation, and functional analysis and verification.

Several tools and methodologies have been developed based on equivalent circuit extraction to allow for fast and accurate modeling of interconnection network belonging to a semiconductor layout. In such methodologies, the interconnect structures of the integrated circuit are divided into smaller sections, and each section is modeled by an equivalent circuit that models its electromagnetic behavior, including electrical behavior, along with any parasitic couplings to the substrate or other nearby structures. LPE (layout parasitic extraction) methodologies can be fast and efficient, and their output is usually a circuit netlist comprising R (resistor) and C (capacitor) lumped elements. Some methods are also capable of separately producing L (inductance) and K (mutual inductance) elements which, besides resistor and capacitor elements, are oftentimes required to accurately model the electromagnetic (EM) behavior of an IC at higher frequencies.

A netlist provides a description of the elements connected between the nodes of a circuit, and can contain a very large amount of information that may consequently be difficult to process, analyze and manipulate. Model-order reduction is an important technique to accelerate the simulation of netlists with large size (>1M of elements) and many ports (>10). Among many model-order reduction algorithms, those based on projection methods provide both increased accuracy and optimal performance. The majority of model-order reduction algorithms that fall in the this category commonly rely on the Krylov subspace projection method, as implemented in PRIMA method (see Odabasioglu, M. Celik, and L. T. Pileggi, "PRIMA: passive reduced-order interconnect macromodeling algorithm", IEEE Trans. on CAD of Integrated Circuits and Systems, 17(8):645-654, 1998) using the Arnoldi process and the input-output structure-preserving model order reduction methodology. (See Yang, X. Zeng, Y. Su, and D. Zhou, "RLC equivalent circuit synthesis method for structure-preserved reduced order model of interconnects in VLSI", Communication in Computational Physics, 3(2):376-396, 2008).

The input-output structure-preserving model-order reduction methodology as described in Yang can be considered an extension of the SPRIM method (see R. W. Freund. "Sprim: structure-preserving reduced-order interconnect macromodeling," Computer Aided Design, 2004. ICCAD-2004. IEEE/ACM International Conference on, pages 80-87, November 2004. See also U.S. Pat. No. 7,228,259 to Freund).

To understand model-order reduction, a review of the algorithms underlying circuit representation in a netlist is useful. These algorithms rely on modified nodal analysis (MNA) formulations underpinned by Kirchhoff's current and voltage laws, which can be expressed through a directional graph. The edges of the graph correspond to the circuit elements, while the nodes of the graph correspond to the nodes of the circuit, denoting the interconnections of the circuit elements. An arbitrary direction is assigned to graph edges, so that one can distinguish between the source and destination nodes. The directional graph can be described by its incidence matrix A, which is formed as follows: Each row of A corresponds to a graph edge and, therefore, to a circuit element. Each column of A corresponds to a graph or circuit node. Each edge e is formed from an ordered pair of nodes $n_1$ and $n_2$, where the direction of e is from $n_1$ to $n_2$. The column corresponding to the ground node of the circuit is deleted in order to remove redundancy. For a row which is associated with the edge e, the column position which corresponds to the source node $n_1$ contains the entry "1", while the column position which corresponds to the destination $n_2$ contains the entry "−1". For all the other cases the entries are "0".

Kirchhoff's current and voltage laws can be expressed using matrix A:

$$A^T i_b = 0 \qquad \text{Eq. 1}$$

$$A v_n = v_b \qquad \text{Eq. 2}$$

where $i_b$ is the vector of the currents through the circuit elements, $v_b$ is the vector of the voltages across the circuit elements, and $v_n$ is the vector of the voltages at the nodes of the circuit (the non-datum voltages). For the ground node the voltage is assumed zero.

In the most general case of analyzing RLCk circuits, we assume that the circuit is excited by voltage and current sources. In this case, the matrix A and the vectors $i_b$ and $v_b$ can be partitioned according to circuit-element types:

$$A = \begin{pmatrix} A_v \\ A_i \\ A_g \\ A_c \\ A_l \end{pmatrix} \quad i_b = \begin{pmatrix} i_v \\ i_i \\ i_g \\ i_c \\ i_l \end{pmatrix} \quad v_b = \begin{pmatrix} v_v \\ v_i \\ v_g \\ v_c \\ v_l \end{pmatrix} \qquad \text{Eq. 3}$$

where the subscripts g, c, l refer to branches with resistors, capacitors and inductors respectively and the subscripts v, i denote the voltage and current sources of the network respectively.

The physical behavior of the circuit elements is described by the branch constitutive (BCR) relations:

$$i_g = gv_g$$
$$i_c = c\frac{\partial}{\partial t}v_c \qquad \text{Eq. 4}$$
$$v_i = l\frac{\partial}{\partial t}i_l$$

Where:
- g and c are diagonal matrices, whose entries correspond to the conductance and capacitance values of each element. These values are positive for any physical circuit, and consequently, both matrices g and c are symmetric positive definite.
- l is the inductance matrix, which is also symmetric positive definite. If mutual inductances are included, then l is a full matrix; otherwise it is a diagonal matrix.

The BCRs for the independent voltage and current sources of the network simply state that $v_v$ and are given functions that can be chosen as inputs to the network, whereas $v_i$ and $i_v$ are unknown output functions that need to be determined as part of the problem of solving the system of equations describing the given RLC network.

A Modified Nodal Analysis (MNA) formulation according to C.-W. HO, A. E. Ruehli, P. A. Brennan, "The Modified Nodal Approach to Network Analysis", IEEE Transactions on Circuits and Systems, Vol. 1X-22, No. 6, June 1975, can be extracted by combining equations 1, 2 and 4, eliminating the current unknowns. MNA equations provide a system representation of an RLCk netlist, as a set of equations that form the time-domain state space representation. For a N-port network, this state space relates the port voltages and currents ($v_v$ and $i_i$) via the state-space vector x, i.e. the node voltages ($v_n$) and the branch currents for voltage sources ($i_v$) and inductors ($i_l$):

$$C\dot{x}+Gx=Bu$$
$$y=B^T x \qquad \text{Eq. 5}$$

The vectors u,y are called input and output vector respectively.

$$\text{Where } x = \begin{bmatrix} v_n \\ i_l \\ i_v \end{bmatrix} \quad u = \begin{bmatrix} -i_i \\ v_v \end{bmatrix} \quad y = \begin{bmatrix} v_i \\ i_v \end{bmatrix} \qquad \text{Eq. 6}$$

$$C = \begin{bmatrix} Q & 0 \\ 0 & l \end{bmatrix} \quad G = \begin{bmatrix} N & A_l^T \\ -A_l & 0 \end{bmatrix} \quad B = \begin{bmatrix} A_i \\ 0 \end{bmatrix} \qquad \text{Eq. 7}$$

$$Q = A_c^T c A_c, \; N = A_g^T g A_g$$

Where: $B \in R^{(N_V+N_l+K)xK}$, $A_i \in R^{KxK}$, $N \in R^{(N_V+K)x(N_V+K)}$,
$Q \in R^{(N_V+K)x(N_V+K)}$, $l \in R^{N_l x N_l}$, $A_l^T \in R^{(N_V+K)x N_l}$ and Nv is the number of internal nodes, $N_l$ is the number of inductors and K the number of ports.

PRIMA Algorithm

The Passive Reduced-Order Interconnect Macromodeling Algorithm (PRIMA) Odabasioglu, M. Celik, and L. T. Pileggi. "PRIMA: passive reduced-order interconnect macromodeling algorithm". IEEE Trans. on CAD of Integrated Circuits and Systems, 17(8):645-654, 1998, is based on the block Arnoldi algorithm, but employs congruence transformations to project a large system of equations onto a smaller subspace, so that passivity is preserved during reduction. PRIMA uses the Arnoldi iteration as a numerically stable method of generating the Krylov subspace. The transformation matrix matches the first n=(q/K) moments for all k ports, where q is the number of nodes. Since the PRIMA reduced order models are generated via projection onto Krylov subspaces, they satisfy the moment-matching property and are guaranteed to be passive. Given the number of nodes q in the reduced netlist and the number of ports K, n=q/K+1 iterations of the block Arnoldi algorithm are performed to derive the projection matrix V (the extra step is required in case that (q/K) is not an integer).

The PRIMA algorithm is performed as described in Table 1:

TABLE 1

The PRIMA algorithm

R = (G + s$_0$C)$^{-1}$ B,
QR decomposition on R − (V$_0$,T) = qr(R)
A = −(G + s$_0$C)$^{-1}$ CV$_0$
for k = 1,2,..., n
  Set V$_k^{(0)}$ = AV$_{k-1}$
  for j = 1,..., k
    V$_k^{(j)}$ = V$_k^{(j-1)}$ − V$_{k-j}$V$_{k-j}^T$V$_k^{(j-1)}$
  end
  V$_k$ = orth(V$_k^{(k)}$)
end
set V = [V$_0$ V$_1$ V$_2$ ...V$_n$], In the original deployment of the algorithm, $s_0$ was supposed to be equal to zero. However experimental results indicated that setting $s_0=0$ leads usually to a close to singular matrix and instability of numerical calculations. Instead of this, an initial $s_0=2\pi f$ is selected by generating a relatively low frequency expansion point, in comparison to the reference bandwidth upper limit and taking care to avoid singularity of the matrix to be inversed.

Structure & I/O Preservation

The matrices G, C and B present certain block structures, which reflect the states of an RCLk circuit. For a given expansion point $s_0$, the reduced-order model generated via projection does not preserve these block structures of the data matrices. In fact, the transformation matrix will be a dense matrix, and then the data matrices of the reduced-order model will also be dense matrices. As a result, synthesizing the system described by the reduced order model, as an actual RLCK electronic circuit, will not be feasible.

A first improvement was performed using the SPRIM approach (R. W. Freund. "Sprim: structure-preserving reduced-order interconnect macromodeling." Computer Aided Design, 2004. ICCAD-2004. IEEE/ACM International Conference on, pages 80-87, November 2004). In contrast to PRIMA, the SPRIM algorithm does not use the matrix V directly for the projection of the original data matrices. Instead, SPRIM utilizes a modified version of the specific matrix:

$$V_{SPRIM} = \begin{bmatrix} V_1 & 0 \\ 0 & V_2 \end{bmatrix} \qquad \text{Eq. 8}$$

Matrices $V_1 \in R^{(N_v+K) \times n}$ and $V_2 \in R^{N_l \times n}$ correspond to the block sizes of G and C respectively. Applying $V_{SPRIM}$ as a projection matrix, a reduced order model is obtained that matches twice as many moments as PRIMA, while the block structure of Eq. 7 is preserved.

Further improvement is introduced by the IOPOR technique (F. Yang, X. Zeng, Y. Su, and D. Zhou, "RLC equivalent circuit synthesis method for structure-preserved reduced order model of interconnects in VLSI", Communication in Computational Physics, 3(2):376-396, 2008) which, in addition to preserving the block structure of the transformation matrices, also preserves the structures of input and output incidence matrices of the system. Starting from the PRIMA projection matrix, the new projection matrix is formed as follows:

$$V_{IOPOR} = \begin{bmatrix} I_{k \times k} & 0 & 0 \\ 0 & V_1 & 0 \\ 0 & 0 & V_2 \end{bmatrix} \quad \text{Eq. 9}$$

Where:
$I_{k \times k}$: Identity Matrix
$V_1$: $N_v \times n$ matrix
$V_2$: $N_l \times n$ matrix If the initial state equations are arranged in such a way that terminal nodes occupy the first k rows of state equation matrices, then the application of the new projection matrix on the initial system preserves both the block structure of equations and the structure of input output incidence matrices. To achieve the final reduced circuit, state equations are reformulated in a second-order form in the frequency-domain. By eliminating $i_l$ in Eq. 6, we obtain the second order system:

$$\left(sQ + N + \frac{F}{s}\right)x = A_i u \quad \text{Eq. 10}$$

where all the system matrices Q, N and F are symmetric and positive semi-definite, $F = A_l^T l^{-1} A_l$ is the susceptance matrix, and $$A_i = \begin{pmatrix} I_{K \times K} \\ 0_{N_V \times K} \end{pmatrix}.$$

Setting $$W = \begin{pmatrix} I_{k \times k} & 0 \\ 0 & V_1 \end{pmatrix}$$

in Eq. 9, we obtain the transformed second order system as:

$$\left(s\tilde{Q} + \tilde{N} + \frac{\tilde{F}}{s}\right)\tilde{x} = \tilde{A}_i u$$

Where: $\tilde{Q} = W^T Q W$, $\tilde{N} = W^T N W$, $\tilde{A}_i = W^T A_i$ $\tilde{l} = V_2^T l V_2$, $\tilde{A}_l = W^T A_l V_2$, $\tilde{F} = \tilde{A}_l^T \tilde{l}^{-1} \tilde{A}_l \quad \text{Eq. 11}$ The second-order description of the reduced system (Eq.12) can be viewed as the nodal equation of a circuit with q nodes, which describes the Kirchhoff current law, satisfied in each node of the circuit.

$$\left(s\tilde{Q} + \tilde{N} + \frac{\tilde{F}}{s}\right)\tilde{x} = \tilde{A}_i u \quad \text{Eq. 12}$$

As explained above, to efficiently integrate the reduced matrices into a simulation methodology flow, the reduced model must be represented in a netlist suitable to be used from any simulation software (Spice, Spectre, etc.). However, after unstamping, the second-order reduced system, the synthesized netlist may be noise incompatible, since it will include negative resistors (See Yang, X. Zeng, Y. Su, and D. Zhou, "RLC equivalent circuit synthesis method for structure-preserved reduced order model of interconnects in VLSI", Communication in Computational Physics, 3(2): 376-396, 2008)). An alternative unstamping scheme (See Jorge Fernandez Villena, L. Miguel Silveira. "Positive realization of reduced RLCM nets", 19th International Conference on VLSI and System-on-Chip (VLSI-SoC), 2011 IEEE/IFIP) will result in positive resistors, however the methodology does not guarantee that the netlist will be accurate at DC.

There is therefore a need to improve the unstamping procedure, to realize a reduced netlist that is noise compatible and accurate at DC.

Overview

As described herein, a circuit analysis method includes obtaining a netlist of a circuit, generating a reduced model from the netlist, using the reduced model to synthesize a positive netlist having no controlled current or voltage sources, unstamping the synthesized positive netlist, and simulating the circuit using the unstamped synthesized positive netlist.

Also as described herein, a circuit analysis system includes a reduced model generator operable to generate a reduced model of a circuit from a netlist of the circuit, a positive netlist synthesizer operable to generate a positive netlist from the reduced model, the positive netlist having no controlled current or voltage sources, and a circuit analyzer for analyzing the circuit based on the positive netlist.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Embodiments of the present invention are described herein in the context of a system and method for circuit analysis. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Santa Clara, Calif., Microsoft® Windows® XP and Windows® 2000, available from Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like.

Figure 1:
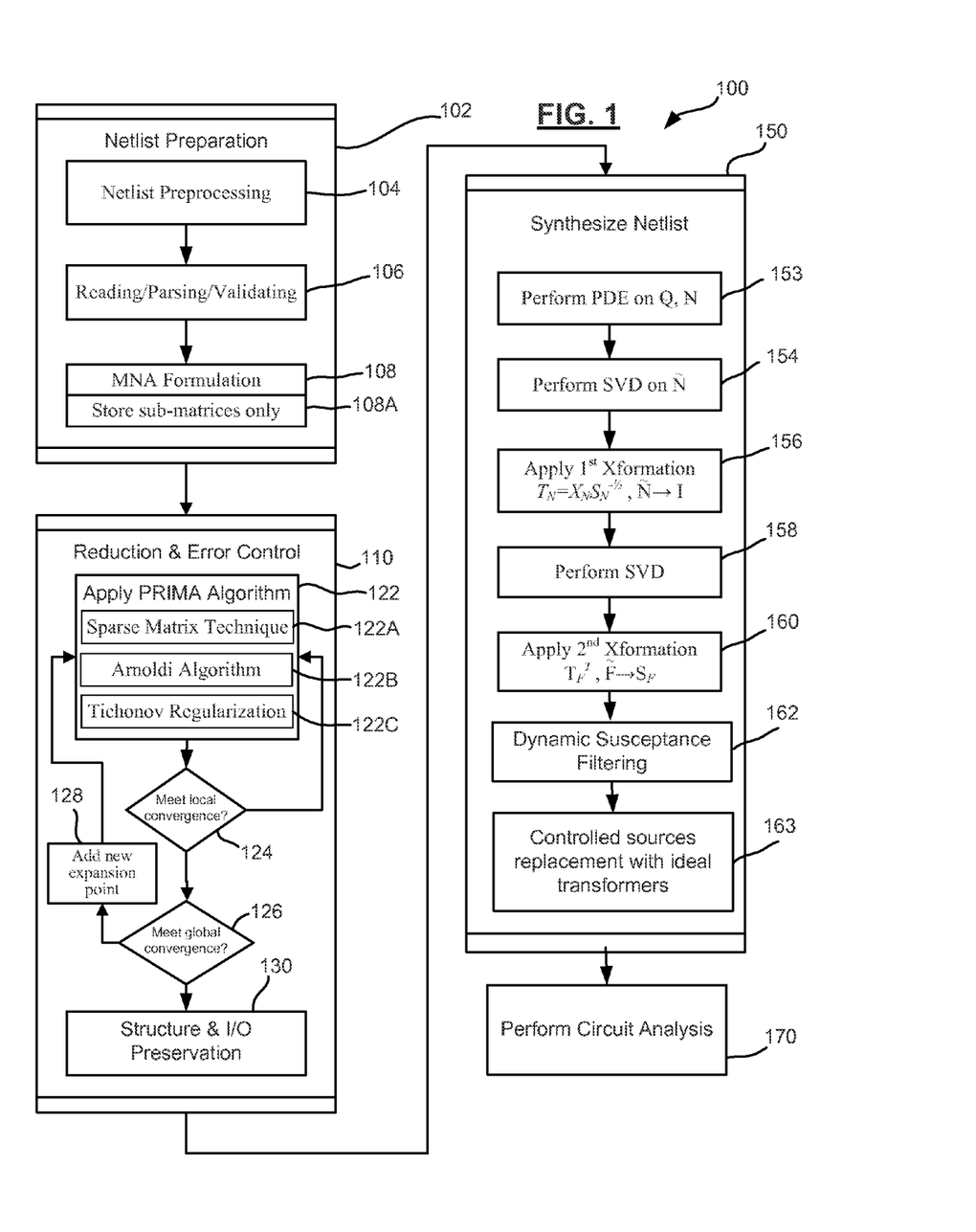
FIG. 1 is a flow diagram for circuit analysis in accordance with certain embodiments.

FIG. 1 is a flow diagram of a circuit analysis method 100 in accordance with certain embodiments. The circuit analysis method 100 begins with a netlist preparation phase 102, followed by a netlist reduction and error control phase 110, a netlist synthesis phase 150, and a circuit analysis phase 170.

The netlist preparation phase 102 includes netlist preprocessing at 104, netlist reading/parsing/validating at 106, and creation of a modified nodal analysis (MNA) formulation at 108. As explained above, MNA equations provide a system representation of the RLCk netlist, as a set of equations that form the time-domain state space representation.

It will be appreciated that a "spice file reader" is used to read the RLCk elements and the port names of a netlist, which are stored in a graph-based data structure. Each vertex in the graph corresponds to a node of the input netlist and each edge corresponds to an element (resistance, capacitance, inductance, and mutual inductance). Additional information is stored for each edge that corresponds to its adjacent nodes and its value. After loading the elements of the netlist, the following steps are performed:

Processing of the graph structure in order to:
  Identify and eliminate the ground node
  Correspond the ports to the first indices of the list. In this way, all the ports will be located in the upper left block of the inner states matrix.
Creation of the matrices: $C(Q,l)$, $G(N, A_l)$ and $B(A_i)$.

For very large RLCk netlists (number of elements $>10^9$) the storage and manipulation of the MNA equations matrices becomes a very challenging task due to the restrictions imposed by the available memory. For an RLCk circuit with $N_V$ nodes, K ports and $N_l$ inductors the full matrix size of both G and C matrices is $(N_V+K+N_l)^2$. However, matrices N, Q, B are by construction sparse and only matrix l must be semi-fully stored as a dense diagonal matrix. Consequently, to relax memory requirements, in certain embodiments, only the sub-matrices Q, l, N, $A_l$ are stored, as shown at 108A, instead of the dense matrices C and G. In this manner the memory requirements are reduced, in worst case, by a factor of four $\max\{[(N_v+k)N_l]^2/(N_v+k+N_l)^2\}$.

After Netlist Preparation (102), the next phase, Reduction and Error Control (110), is commenced. The netlist reduction and error control phase 110 includes application of the PRIMA algorithm, at 122.

The main initial step of PRIMA implementation requires the solution of a system of equations:

$$B=(G+s_0C)R \qquad \text{Eq. 13}$$

which may have drawbacks: its large size, its non-sparse form and its non-symmetric shape limit use of time-consuming LU decomposition solvers. To address this issue, the block storage of sparse sub-matrices can be exploited in accordance with certain embodiments, as shown at 122A, by formulating Eq. 13 in a block system description as follows:

$$\begin{bmatrix} N+s_0Q & A_l^T \\ -A_l & s_0l \end{bmatrix} \begin{bmatrix} R_u \\ R_l \end{bmatrix} = \begin{bmatrix} A_i \\ 0 \end{bmatrix} \qquad \text{Eq. 14}$$

wherein:

$$R = \begin{bmatrix} R_u \\ R_l \end{bmatrix} \qquad \text{Eq. 15}$$

A 2×2 block system of equations is obtained, which is solved as follows: First, in order to calculate $R_l$, the following equation is derived:

$$R_l = \frac{1}{s_0} l^{-1} A_l R_u \qquad \text{Eq. 16}$$

Substituting $R_l$ in Eq. 14 and solving for $R_u$ yields:

$$\left(N + s_0 Q + \frac{A_l^T l^{-1} A_l}{s_0}\right) R_u = A_i \qquad \text{Eq. 17}$$

With this step, the symmetric Matrix $l^{-1}$ is transformed into the sparse matrix $A_l^T l^{-1} A_l$. As a result, sparse matrix arithmetic can be employed to solve a sparse matrix linear system with semi-definite positive matrices (Sparse-Cholesky solver).

The benefits from the specific approach are:
- A more efficient memory manipulation, by de-allocating dense matrices.
- Increase in performance, by adopting a fast-Sparse-Cholesky (SC) decomposition instead of using the general LU decomposition algorithm for solving the aforementioned linear system. The SC decomposition increases the speed of computations by a factor greater than two (as for dense matrices the benefit when applying Cholesky decomposition complexity decreases from 2n3/3 to n3/3).

Due to algorithmic arithmetic inaccuracies, the projection matrix V may be ill-conditioned and any transformation with the specific matrix may yield ill-conditioned projected matrices and, by consequence, an ill-conditioned reduced matrix pencil. To overcome this, Tichonov regularization is applied at 122C, which improves the conditioning of the projection matrix, thus enabling an accurate numerical solution for the reduced system.

Having defined the R matrix, the PRIMA algorithm is performed based on projection matrix V generated from the block Arnoldi algorithm (122B in FIG. 1):

The initial variable x is changed according to the congruence transformation:

$$x = V\tilde{x} \qquad \text{Eq. 18}$$

$$(V^T C V)\dot{\tilde{x}} + (V^T G V)\tilde{x} = (V^T B)u \qquad \text{Eq. 19}$$

$$y = (B^T V)\tilde{x} \qquad \text{Eq. 20}$$

In the reduced description of the system the reduced order matrices are:

$$\tilde{C} = V^T C V, \; \tilde{G} = V^T G V, \; \tilde{B} = V^T B \qquad \text{Eq. 21}$$

Following the PRIMA application, the flow proceeds to 124. Briefly, it is determined if a local convergence threshold is met. If it is not met, then the iteration is repeated until a local convergence threshold is met. Then at 126, it is determined if a global convergence threshold is also met. If it is not met, then a new expansion point is added, at 128, and the iteration is repeated until the global convergence threshold is met or at most three expansion points are processed.

An efficient error estimation and control methodology must be able to intelligently select the expansion points, based on specific accuracy requirements. A major drawback of all Krylov-based model order reduction techniques is the difficulty to define a global error boundary to be used as convergence criterion. Some attempts have been reported in literature to provide an absolute estimation of an error boundary (see Altan Odabasioglu et al., "Practical considerations for passive reduction of RLC circuits", Proceedings of the 1999 IEEE/ACM international conference on computer-aided design (ICCAD), Previously presented. 214-220), but they are usually overestimating this error, leading to larger netlists than necessary and having augmented computational complexity in comparison to the core computations complexity method.

In certain embodiments, the error estimation, for each iteration of the PRIMA algorithm, is performed using the following relation:

$$\max_{i=1 \ldots N} \left( \frac{\|\tilde{Z}_q(s_i) - \tilde{Z}_{q-1}(s_i)\|}{\|\tilde{Z}_q(s_i)\|} \right) \qquad \text{Eq. 21}$$

Where $\tilde{Z}_q(S_i)$ is the Z function of the reduced system for the q iteration, calculated at frequency $s_i$, and N is the number of frequency sample points. For improved accuracy, $s_i$ is represented as an imaginary number.

To define whether an additional expansion point is needed and provide an estimation of the convergence achieved, the following methodology is employed:
a) First, the error is evaluated for frequency points in the neighbor of the expansion point. If f is the frequency of a give expansion point, the checking points in certain embodiments are located at 0.85*f, 0.95*f, 1.05*f, 1.15*f. In this way, an estimation of the local convergence is performed, for a given expansion point.
b) Second, the global convergence is estimated, evaluating the error at 15 points in certain embodiments, uniformly distributed across all bandwidths of interest.
c) Based on the local and global estimations, and with reference again to steps 122-126 in FIG. 1, the following decisions are made:
   a. If the local and global convergence is not reached (the error is less than a given threshold value), the algorithm proceeds to the next iteration (adding more moments) within the cycle of the same expansion point.
   b. If local convergence is achieved without global convergence the method proceeds by selecting another expansion point (step 128).
   c. In certain embodiments, the choice of the expansion points is made as follows: The first expansion point is fixed at 0.1 GHz, while the second point is introduced at the end of the frequency band. A third frequency point is added, if needed, in the frequencies having the largest error value.
   d. If global convergence is achieved the method ends and the flow proceeds to a structure and I/O preservation procedure 130.

It will be recalled that conventionally, structure and I/O preservation involves the application of SPRIM and IOPOR techniques to respectively preserve the block structure of the transformation matrices and the input and output incidence matrices of the system.

Following the structure and I/O preservation procedure 130, netlist synthesis phase 150 commences. A starting point for the positive netlist synthesis 150 is the second order description.

The reduced system extracted from the reduction flow, can be represented as a second-order formulation described in eq. 22.

$$\left(s\tilde{Q} + \tilde{N} + \frac{\tilde{F}}{s}\right)\tilde{x} = A_i u \qquad \text{Eq. 22}$$

Where:
and $$A_i = \begin{pmatrix} I_{K \times K} \\ 0_{(q-K) \times K} \end{pmatrix} \qquad \text{Eq. 23}$$

$\tilde{Q}$: Reduced capacitance matrix
$\tilde{N}$: Reduced resistor matrix
$\tilde{F}$: Reduced susceptance (inverse of inductance) matrix
$\tilde{x}$: Reduced state-space vector including the node voltages and the branch currents for inductors
u: Input vector including the voltage sources applied in the ports
s: Laplace frequency notation
K: Number of ports
q: Number of nodes in the reduced netlist This second order description can be viewed as the nodal equation of a circuit with q nodes, which describes the Kirchoff current law, satisfied at each node of the circuit.

Since $\tilde{Q}$ and $\tilde{N}$ may be semi-definite positive matrices, at 153, a positive definite enforcement (PDE) procedure is applied. In this manner, the very small eigenvalues below a specific threshold value are set equal to that value and then the matrices are reconstructed based on the eigenvectors and the new eigenvalues. Consequently $\tilde{Q}$ and $\tilde{N}$ become symmetric and positive definite matrices.

At 154, a singular value decomposition (SVD) is performed on matrix $\tilde{N}$:

$$\tilde{N} = X_N S_N X_N^T \qquad \text{Eq. 25}$$

which results in:

$$\left(s\tilde{Q} + X_N S_N X_N^T + \frac{\tilde{F}}{s}\right)\tilde{x} = A_i u \qquad \text{Eq. 26}$$

Considering the following matrix:

$$T_N = X_N S_N^{-1/2} \qquad \text{Eq. 27}$$

At 156 a first transformation is applied as follows:

$$T_N^T\left(s\tilde{Q} + X_N S_N X_N^T + \frac{\tilde{F}}{s}\right)T_N \tilde{x} = T_N^T A_i u \qquad \text{Eq. 26}$$

Since $\tilde{N}$ is symmetric and positive definite matrix, $X_N^{-1} = X_N^T$ which results in the transformation of the $\tilde{N}$ matrix to the identity matrix I:

$$\left(sT_N^T\tilde{Q}T_N + I + \frac{T_N^T\tilde{F}T_N}{s}\right)\tilde{x} = T_N^T A_i u \qquad \text{Eq. 28}$$

Next at 158, a Singular Value Decomposition to the following case is performed:

$$T_N^T\tilde{F}T_N = T_F S_F T_F^T \qquad \text{Eq. 29}$$

and the system is described as follows:

$$\left(sT_N^T\tilde{Q}T_N + I + \frac{T_F S_F T_F^T}{s}\right)\tilde{x} = T_N^T A_i u \qquad \text{Eq. 30}$$

At 160, the next transformation is then performed as follows:

$$T_F^T\left(sT_N^T\tilde{Q}T_N + I + \frac{T_F S_F T_F^T}{s}\right)T_F \tilde{x} = T_F^T T_N^T A_i u \qquad \text{Eq. 31}$$

to obtain the system:

$$\left(sT_F^T T_N^T\tilde{Q}T_N T_F + I + \frac{S_F}{s}\right)\tilde{x} = T_F^T T_N^T A_i u \qquad \text{Eq. 32}$$

Considering the following matrices:

$$Q_{new} = T_F^T T_N^T \tilde{Q} T_N T_F \qquad \text{Eq. 33}$$

$$A_{i,new} = T_F^T T_N^T A_i \qquad \text{Eq. 34}$$

the system is equivalently described by:

$$\left(sQ_{new} + I + \frac{S_F}{s}\right)\tilde{x} = A_{i,new} u \qquad \text{Eq. 35}$$

In the specific description of Eq. 35, the identity matrix I corresponds to the reduced resistor $\tilde{N}$ matrix and can be directly unstamped by constant value resistors to Gnd, whereas the susceptance $\tilde{F}$ matrix can be realized by a set of inductors from each node to Gnd. The $Q_{new}$ matrix can be unstamped as follows:

For each off-diagonal entry $Q_{new,ij}$, a capacitor $C_{ij} = -Q_{new,ij}$, is inserted between nodes i, j For each diagonal entry $Q_{new,ii}$, a capacitor $C_i = \Sigma_{j=1}^m Q_{new,ij}$ is inserted between node i and gnd.

Figure 2:
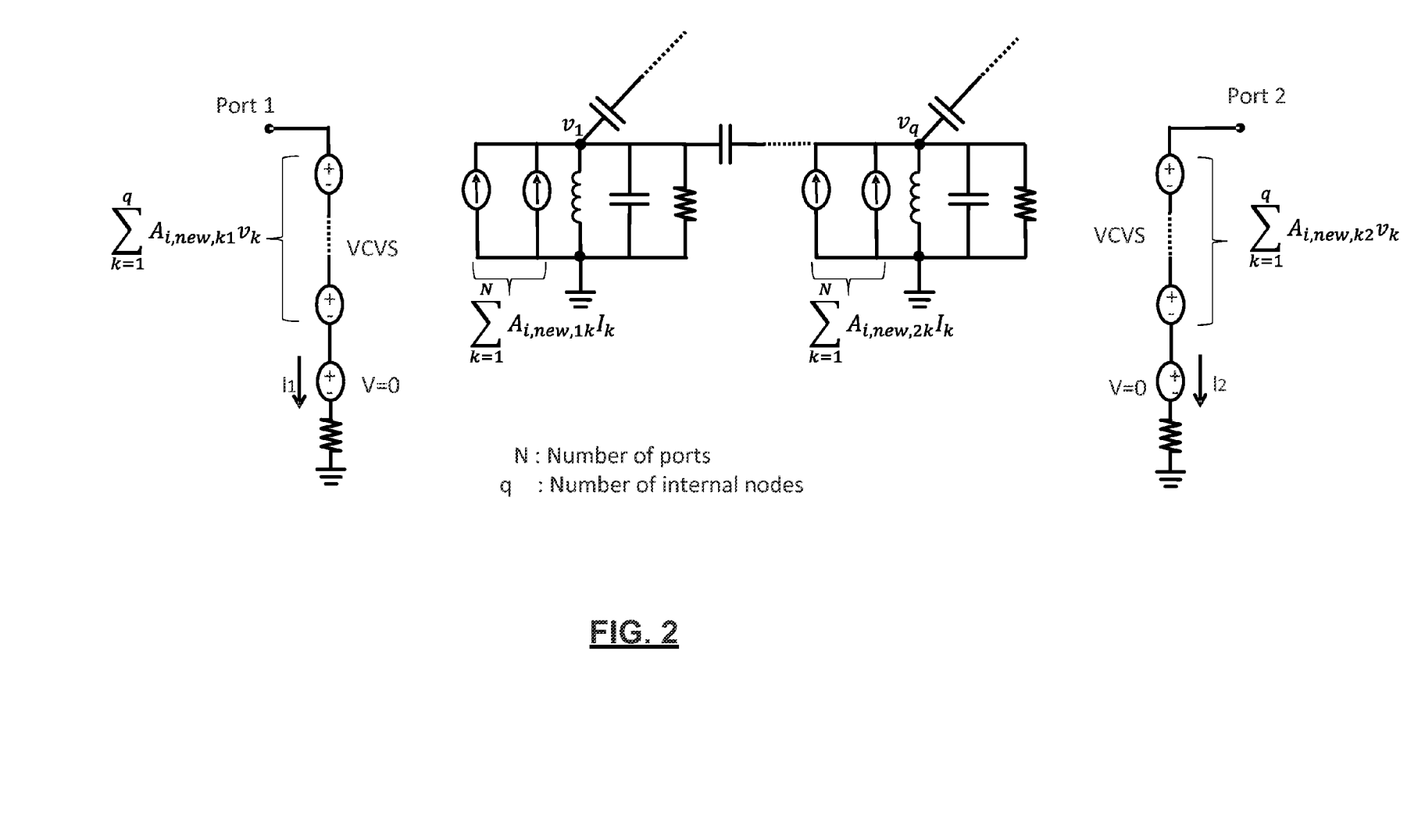
FIG. 2 is a schematic of a synthesized circuit for a two port network in accordance with certain embodiments.

The final synthesized circuit for a two port network is presented in FIG. 2.

The reduced netlist synthesized during the previous steps, cannot be used at DC. This is due to the fact that after unstamping the susceptance matrix, every node includes an inductor to Gnd. Consequently at DC all nodes are connected to Gnd, since the inductors behave as short-circuits. The DC behavior of the netlist can be extracted by filtering-out the susceptances that are smaller than a specific threshold value, as applied at 162. The netlist can be equivalently represented in a more user-friendly format, by substituting at 163 the pairs of current controlled current sources (CCCS) and voltage controlled voltage sources (VCVS) with ideal transformers.

Figure 3:
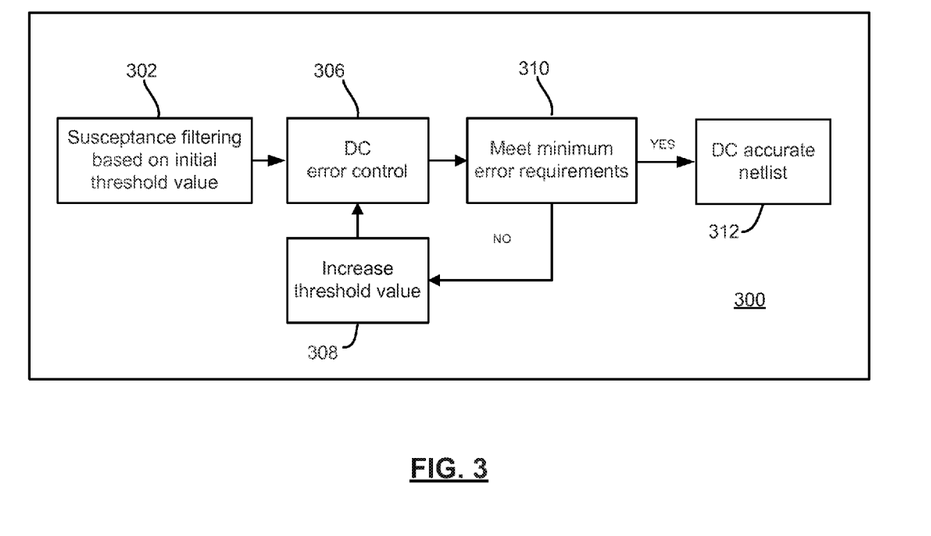
FIG. 3 is a flow diagram showing the DC behavior extraction in accordance with certain embodiments.

DC behavior extraction 300 can be conducted by introducing a dynamic susceptance filtering scheme, as detailed below with reference to FIG. 3. First a susceptance filtering is applied at 302, based on an initial threshold value. A DC error control of the netlist with respect to the reduced matrices is then applied at 306, based on the following relation:

$$\max_{i=1...N}\left(\frac{\|\tilde{S}_{netlist(DC)} - \tilde{S}_{system(DC)}\|}{\|\tilde{S}_{system(DC)}\|}\right)$$

where $\tilde{S}_{netlist(DC)}$ and $\tilde{S}_{system(DC)}$ is the S function of the reduced netlist and reduced matrix description of the system respectively, calculated at DC. If the error value at 310 is larger than a predefined value, an increased threshold value is introduced at 308, followed by a new error control. When the error becomes lower than the predefined value the final DC-accurate netlist is synthesized, at 312.

Figure 4:
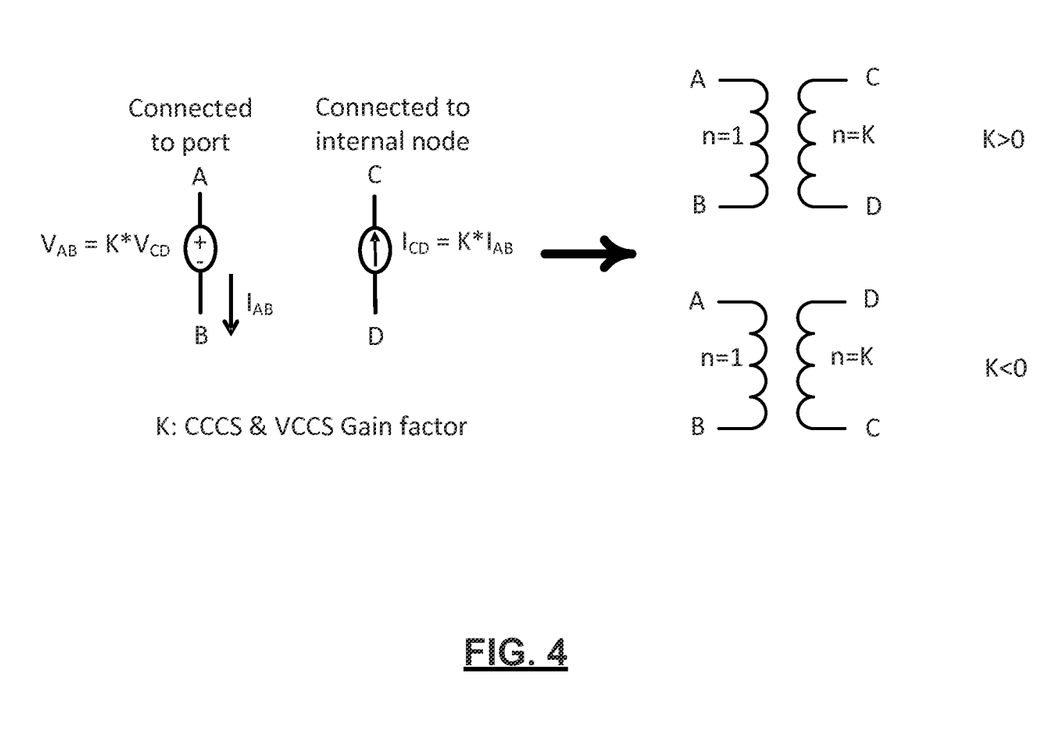
FIG. 4 is a schematic of a synthesized circuit for a two port network with ideal transformers in accordance with certain embodiments.

The replacement of the controlled sources with ideal transformers is based on the equivalent circuit illustrated in FIG. 4. A pair of a CCCS (current-controlled current sources) and VCVS (voltage-controlled voltage source) with a positive gain factor K, inserted between a port and an internal node, respectively, can be substituted with an ideal transformer, utilizing 1 and K number of turns for the primary and secondary coil, respectively. If K is negative, the output nodes of the secondary must be interchanged.

One of the main advantages of the described embodiments is that the synthesized netlist strictly utilizes positive resistors, while the controlled sources are inserted only to realize the interconnections between the ports and the internal nodes. In this manner, the noise context of the original netlist is preserved and the netlist can be used for noise analysis. An alternative representation of the netlist may include ideal transformers instead of the controlled sources (CCCS, VCVS). Furthermore, by introducing the dynamic susceptance filtering, a netlist accurate at DC is synthesized. Consequently the synthesized netlist can safely support any kind of circuit analysis: DC, transient, noise, frequency, S-parameter.

Figure 5:
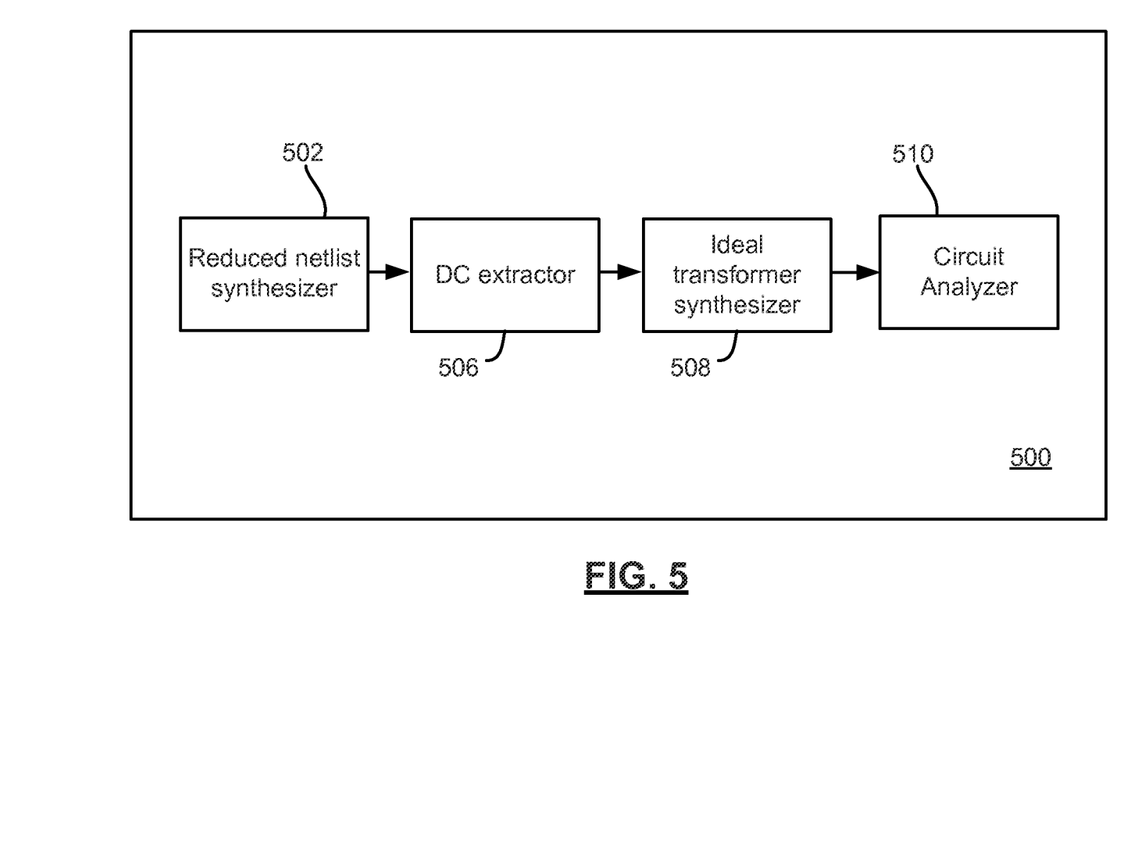
FIG. 5 is a block diagram of a system 500 for implementing circuit analysis using the synthesized netlist in accordance with certain embodiments.

FIG. 5 is a block diagram of a system 500 for implementing circuit analysis using the synthesized netlist in accordance with certain embodiments. A reduced netlist generator 502 receives circuit information as input and generates there from a reduced model of the circuit. The circuit information from the reduced model generator can be in any computer-readable form, such as floppy or optical disk, data file, server, or the like. The reduced model is provided to a DC extractor 506, ensuring that the synthesized netlist is DC accurate. Ideal transformers are utilized 508 to replace the CCCSs and VCVSs. Different kinds of analysis can be performed by the circuit analyzer 510, such as transient, frequency, s-parameter, noise, periodic steady-state, harmonic balance, and so on.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A circuit analysis method comprising:
   obtaining a netlist of a circuit;
   generating a reduced model from the netlist;
   using the reduced model to synthesize a DC-accurate noise compatible netlist utilizing positive resistors and inductors, negative capacitors and ideal transformers, said synthesizing including applying susceptance filtering based on an initial threshold value and applying DC error control;
   analyzing the circuit using the synthesized DC-accurate noise compatible netlist; and
   fabricating the circuit using the results of the analysis.

2. The method of claim 1, wherein generating a reduced model from the netlist includes performing Tichonov regularization.

3. The method of claim 1, wherein the reduced model is representable as a second-order formulation given as $$\left(s\tilde{Q} + \tilde{N} + \frac{\tilde{F}}{s}\right)\tilde{x} = A_i u$$

where $$A_i = \begin{pmatrix} I_{K \times K} \\ 0_{(q-K) \times K} \end{pmatrix}$$

and
   $\tilde{Q}$: Reduced capacitance matrix
   $\tilde{N}$: Reduced resistor matrix
   $\tilde{F}$: Reduced susceptance (inverse of inductance) matrix
   $\tilde{x}$: Reduced state-space vector including the node voltages and the branch currents for inductors
   u: Input vector including the voltage sources applied in the ports
   s: Laplace frequency notation
   K: Number of ports
   q: Number of nodes in the reduced netlist
and wherein using the reduced model to synthesize a positive netlist comprises:
   applying positive definite enforcement (PDE)
   performing a first singular value decomposition on the matrix $\tilde{N}$, represented as
   $\tilde{N} = X_N S_N X_N^T$,
to achieve $$\left(s\tilde{Q} + X_N S_N X_N^T + \frac{\tilde{F}}{s}\right)\tilde{x} = A_i u$$

considering the matrix $T_N = X_N S_N^{-1/2}$, applying a first transformation $$T_N^T\left(s\tilde{Q} + X_N S_N X_N^T + \frac{\tilde{F}}{s}\right)T_N \tilde{x} = T_N^T A_i u$$

to achieve to the identity matrix I $$\left(sT_N^T \tilde{Q} T_N + I + \frac{T_N^T \tilde{F} T_N}{s}\right)\tilde{x} = T_N^T A_i u$$

performing a second singular value decomposition $T_N^T \tilde{F} T_N = T_F S_F T_F^T$ to achieve $$\left(sT_N^T \tilde{Q} T_N + I + \frac{T_F S_F T_F^T}{s}\right)\tilde{x} = T_N^T A_i u$$

applying a second transformation, $$T_F^T\left(sT_N^T\tilde{Q}T_N + I + \frac{T_F S_F T_F^T}{s}\right)T_F\tilde{x} = T_F^T T_N^T A_i u$$

to obtain $$\left(sT_F^T T_N^T\tilde{Q}T_N T_F + I + \frac{S_F}{s}\right)\tilde{x} = T_F^T T_N^T A_i u$$

considering the following matrices $Q_{new}=T_F^T T_N^T \tilde{Q} T_N T_F$ $A_{i,new}=T_F^T T_N^T A_i$, representing the circuit as $$\left(sQ_{new} + I + \frac{S_F}{s}\right)\tilde{x} = A_{i,new}u$$

4. The method of claim 3, wherein the identity matrix I and the positive valued diagonal matrix $S_F$ correspond respectively to the reduced resistor $\tilde{N}$ and susceptance $\tilde{F}$ matrices, the method further including direct unstamping of the identity matrix I and the positive valued diagonal matrix $S_F$ by constant value positive resistors and positive inductors to Gnd respectively.

5. The method of claim 3, further comprising extracting DC behavior of the netlist by introducing a dynamic susceptance filtering scheme.

6. The method of claim 5, wherein the DC extraction includes:
    applying a first susceptance filtering based on an initial threshold value
    calculating DC error control of the netlist with respect to the reduced matrices, based on the following relation:

$$\max_{i=1...N}\left(\frac{\|\tilde{S}_{netlist(DC)} - \tilde{S}_{system(DC)}\|}{\|\tilde{S}_{system(DC)}\|}\right)$$

where $\tilde{S}_{netlist(DC)}$ and $\tilde{S}_{system(DC)}$ is the S function of the reduced netlist and reduced matrix description of the system respectively, calculated at DC,
    increasing the initial threshold value if a calculated error value is above a predefined value
    synthesizing a DC accurate netlist when the calculated error value becomes lower than a predefined value.

7. The method of claim 5, further comprising replacing controlled sources with ideal transformers.

8. A non-transitory program storage device readable by a machine, embodying a program of instructions executable by the machine to perform a circuit analysis method, the method comprising:
    obtaining a netlist of a circuit;
    generating a reduced model from the netlist; and
    using the reduced model to synthesize a DC-accurate noise compatible netlist utilizing positive resistors and inductors, negative capacitors and ideal transformers, said synthesizing including applying susceptance filtering based on an initial threshold value and applying DC error control;
    analyzing the circuit using the synthesized DC-accurate noise compatible netlist; and
    fabricating the circuit using the results of the analysis.

9. The device of claim 8, wherein generating a reduced model from the netlist includes performing Tichonov regularization.

10. The device of claim 8, wherein the reduced model is representable as a second-order formulation given as $$\left(s\tilde{Q} + \tilde{N} + \frac{\tilde{F}}{s}\right)\tilde{x} = A_i u$$

where $$A_i = \begin{pmatrix} I_{K\times K} \\ 0_{(q-K)\times K} \end{pmatrix}$$

and
    $\tilde{Q}$: Reduced capacitance matrix
    $\tilde{N}$: Reduced resistor matrix
    $\tilde{F}$: Reduced susceptance (inverse of inductance) matrix
    $\tilde{x}$: Reduced state-space vector including the node voltages and the branch currents for inductors
    u: Input vector including the voltage sources applied in the ports
    s: Laplace frequency notation
    K: Number of ports
    q: Number of nodes in the reduced netlist
and wherein using the reduced model to synthesize a positive netlist comprises:
    applying positive definite enforcement (PDE)
    performing a first singular value decomposition on the matrix $\tilde{N}$, represented as $\tilde{N}=X_N S_N X_N^T$, to achieve $$\left(s\tilde{Q} + X_N S_N X_N^T + \frac{\tilde{F}}{s}\right)\tilde{x} = A_i u$$

considering the matrix $T_N = X_N S_N^{-1/2}$, applying a first transformation $$T_N^T\left(s\tilde{Q} + X_N S_N X_N^T + \frac{\tilde{F}}{s}\right)T_N \tilde{x} = T_N^T A_i u$$

to achieve to the identity matrix I $$\left(sT_N^T\tilde{Q}T_N + I + \frac{T_N^T \tilde{F} T_N}{s}\right)\tilde{x} = T_N^T A_i u$$

performing a second singular value decomposition $T_N^T \tilde{F} T_N = T_F S_F T_F^T$ to achieve $$\left(sT_N^T\tilde{Q}T_N + I + \frac{T_F S_F T_F^T}{s}\right)\tilde{x} = T_N^T A_i u$$

applying a second transformation, $$T_F^T \left( sT_N^T \tilde{Q} T_N + I + \frac{T_F S_F T_F^T}{s} \right) T_F \tilde{x} = T_F^T T_N^T A_i u$$

to obtain $$\left( sT_F^T T_N^T \tilde{Q} T_N T_F + I + \frac{S_F}{s} \right) \tilde{x} = T_F^T T_N^T A_i u$$

considering the following matrices $$Q_{new} = T_F^T T_N^T \tilde{Q} T_N T_F$$

$$A_{i,new} = T_F^T T_N^T A_i,$$

representing the circuit as $$\left( sQ_{new} + I + \frac{S_F}{s} \right) \tilde{x} = A_{i,new} u$$

11. The device of claim 10, wherein the identity matrix I and the positive valued diagonal matrix $S_F$ correspond respectively to the reduced resistor $\tilde{N}$ and susceptance $\tilde{F}$ matrices, the method further including direct unstamping of the identity matrix I and the positive valued diagonal matrix $S_F$ by constant value positive resistors and positive inductors to Gnd respectively.

12. The device of claim 10, the method further comprising extracting DC behavior of the netlist by introducing a dynamic susceptance filtering scheme.

13. The device of claim 12, wherein the DC extraction includes:
applying a first susceptance filtering based on an initial threshold value
calculating DC error control of the netlist with respect to the reduced matrices, based on the following relation:

$$\max_{i=1\ldots N} \left( \frac{\|\tilde{S}_{netlist(DC)} - \tilde{S}_{system(DC)}\|}{\|\tilde{S}_{system(DC)}\|} \right)$$

where $\tilde{S}_{netlist(DC)}$ and $\tilde{S}_{system(DC)}$ is the S function of the reduced netlist and reduced matrix description of the system respectively, calculated at DC,
increasing the initial threshold value if a calculated error value is above a predefined value
synthesizing a DC accurate netlist when the calculated error value becomes lower than a predefined value.

14. The device of claim 12, further comprising replacing controlled sources with ideal transformers.

* * * * *